United States Patent
Ogawa

(10) Patent No.: US 8,810,183 B2
(45) Date of Patent: Aug. 19, 2014

(54) PWM SIGNAL OUTPUT CIRCUIT

(75) Inventor: Takashi Ogawa, Gifu-ken (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 116 days.

(21) Appl. No.: 13/618,062

(22) Filed: Sep. 14, 2012

(65) Prior Publication Data

US 2013/0069580 A1    Mar. 21, 2013

(30) Foreign Application Priority Data

Sep. 15, 2011    (JP) .................................. 2011-202181

(51) Int. Cl.
| | |
|---|---|
| H02P 1/00 | (2006.01) |
| H02P 1/28 | (2006.01) |
| H02P 3/00 | (2006.01) |
| H02P 25/04 | (2006.01) |
| H02P 27/08 | (2006.01) |

(52) U.S. Cl.
CPC ............ *H02P 27/08* (2013.01); *H02P 2209/07* (2013.01); *H02P 25/04* (2013.01)
USPC ........... 318/504; 318/811; 318/599; 318/601; 318/603

(58) Field of Classification Search
CPC ...................................................... H02P 27/08
USPC .......................... 318/504, 599–601, 603, 811
See application file for complete search history.

(56) References Cited

U.S. PATENT DOCUMENTS

| | | | |
|---|---|---|---|
| 8,274,247 B2 * | 9/2012 | Itoh et al. ................. | 318/400.02 |
| 8,471,519 B2 * | 6/2013 | Ito et al. ........................ | 318/801 |
| 8,653,870 B2 * | 2/2014 | Ogawa ........................ | 327/175 |

FOREIGN PATENT DOCUMENTS

| | | | |
|---|---|---|---|
| JP | 2004-153921 A | 5/2004 | |
| JP | 2007-037387 A | 2/2007 | |

* cited by examiner

*Primary Examiner* — Erick Glass
(74) *Attorney, Agent, or Firm* — Robert F. Hightower

(57) ABSTRACT

A PWM-signal-output circuit includes a detecting unit to detect periods in which a speed signal with logic level changing alternately and having a period corresponding to a motor-rotation speed is at one and the other logic levels, a dividing unit to divide each of the periods into first to third periods; a first output unit to change a PWM-signal duty-cycle in a stepwise manner toward an input-signal duty-cycle in the first period, a second output unit to cause a PWM-signal duty-cycle to become equal to an input-signal duty-cycle, to maintain a current flowing through the motor coil constant, in the second period; and a third output unit to change a PWM-signal duty-cycle in a stepwise manner from an input-signal duty-cycle, to decrease a current flowing through the motor coil, in the third period.

9 Claims, 16 Drawing Sheets

PWM SIGNAL OUTPUT CIRCUIT

CROSS-REFERENCE TO RELATED APPLICATION

This application claims the benefit of priority to Japanese Patent Application No. 2011-202181, filed Sep. 15, 2011, of which full contents are incorporated herein by reference.

BACKGROUND OF THE INVENTION

1. Field of the Invention

The present invention relates to a PWM signal output circuit.

2. Description of the Related Art

With respect to a motor drive circuit configured to drive a motor while changing a current of a motor coil in a gradual manner, a BTL (Bridged Transformer Less) system motor drive circuit and a motor drive circuit configured to perform soft switching are known (see, e.g., Japanese Laid-Open Patent Publication No. 2007-37387 and Japanese Laid-Open Patent Publication No. 2004-153921).

In the BTL system motor drive circuit disclosed in Japanese Laid-Open Patent Publication No. 2007-37387, since high-accuracy operational amplifier, etc., are generally required to be used, the circuit size becomes large.

On the other hand, in the motor drive circuit configured to perform soft switching disclosed in Japanese Laid-Open Patent Publication No. 2004-153921, a soft-switching period for changing a drive current of the motor coil in a gradual manner is constant. Thus, in such a circuit, when the rotation speed of the motor decreases, the ratio of the soft-switching period out of the period during which the motor is driven becomes small. Therefore, it becomes difficult to change the drive current in a gradual manner.

SUMMARY OF THE INVENTION

A PWM signal output circuit according to an aspect of the present invention that is configured to output a PWM signal with a duty cycle corresponding to a duty cycle of an input signal to a drive circuit configured to drive a motor based on the PWM signal, includes: a detecting unit configured to detect a time period in which a speed signal is at one logic level and a time period in which the speed signal is at an other logic level, based on the speed signal whose logic level changes in an alternate manner, the speed signal having a period corresponding to a rotation speed of the motor; a dividing unit configured to divide each of the time periods detected by the detecting unit into first to third time periods; a first output unit configured to control a duty cycle of the PWM signal so that the duty cycle of the PWM signal changes in a stepwise manner toward a duty cycle of the input signal, in order to increase a current flowing through a motor coil of the motor, in the first time period, and output the PWM signal with the duty cycle; a second output unit configured to control a duty cycle of the PWM signal so that the duty cycle of the PWM signal becomes equal to a duty cycle of the input signal, in order to maintain a current flowing through the motor coil constant, in the second time period, and output the PWM signal with the duty cycle; and a third output unit configured to control a duty cycle of the PWM signal so that the duty cycle of the PWM signal changes in a stepwise manner from a duty cycle of the input signal, in order to decrease a current flowing through the motor coil, in the third time period, and output the PWM signal with the duty cycle.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 2 is a diagram illustrating a configuration of a drive signal output circuit 24a;

DETAILED DESCRIPTION OF THE INVENTION

At least the following details will become apparent from descriptions of this specification and of the accompanying drawings.

Figure 1:
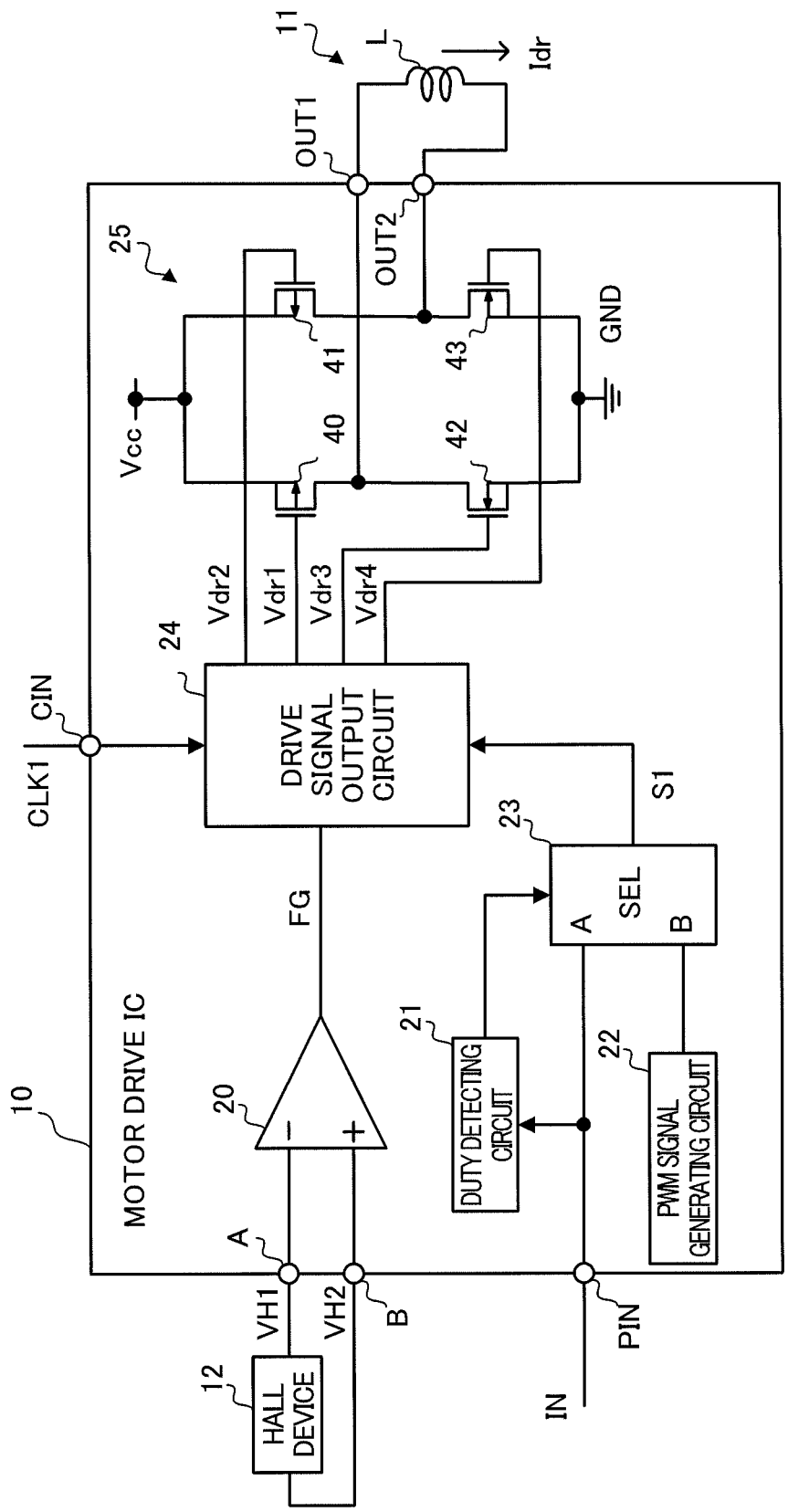
FIG. 1 is a diagram illustrating a configuration of a motor drive IC 10 according to an embodiment of the present invention.

FIG. 1 depicts a configuration of a motor drive IC 10 according to an embodiment of the present invention. The motor drive IC 10 is a circuit configured to drive a motor 11 so that the rotation speed of the motor 11 reaches the rotation speed according to the duty cycle of a PWM (Pulse Width Modulation) signal IN outputted from a microcomputer (not shown).

The motor drive IC 10 includes a comparator 20, a duty detecting circuit 21, a PWM signal generating circuit 22, a selector (SEL) 23, a drive signal output circuit 24, an H-bridge circuit 25, and terminals A, B, PIN, CIN, OUT1, and OUT2.

The motor 11 is a single-phase fan motor configured to rotate a cooling fan, for example.

A Hall device 12 is configured to output, to the terminals A and B, Hall signals VH1 and VH2 acquired according to the rotational position of a rotor (not shown) in the motor 11, respectively.

The comparator 20 is configured to compare levels of the Hall signals VH1 and VH2 and generate an FG (Frequency Generator) signal with such a period as to change according to the rotation speed of the motor 11. The FG signal (speed signal) goes low (hereinafter, L level) when the level of the Hall signal VH1 becomes higher than the level of the Hall signal VH2, and goes high (hereinafter, H level) when the level of the Hall signal VH1 becomes lower than the level of the Hall signal VH2. Therefore, the logic level of the FG signal changes every half period.

The duty detecting circuit 21 is configured to detect whether the duty cycle of H level (hereinafter referred to simply as duty cycle) of the PWM signal IN inputted from the microcomputer (not shown) via the terminal PIN is 100%. Specifically, the duty detecting circuit 21 detects that the duty cycle of the PWM signal IN is 100% when not detecting a rising edge of the PWM signal IN for a predetermined time period.

The PWM signal generating circuit 22 is configured to generate the PWM signal with the predetermined period, whose duty cycle is 99%, for example.

The selector 23 is configured to output the signal inputted to a B input when it is detected that the duty cycle of the PWM signal IN is 100%, and output the PWM signal IN inputted to an A input when it is detected that the duty cycle of the PWM signal IN is not 100%.

Therefore, a PWM signal S1 whose duty cycle is equal to or smaller than 99% is constantly outputted from the selector 23. The circuits of the selector 23, etc., are the circuits configured to prevent the drive signal output circuit 24 from malfunctioning due to the PWM signal with 100% duty cycle.

The drive signal output circuit 24 is configured to output drive signals Vdr1 to Vdr4 for controlling the H-bridge circuit 25, based on a clock signal CLK1 with the predetermined period inputted via the terminal CIN, the FG signal, and the PWM signal S1.

The H-bridge circuit 25 (drive circuit) includes PMOS transistors 40 and 41 and NMOS transistors 42 and 43. A connection point between the PMOS transistor 40 and the NMOS transistor 42 is connected to the terminal OUT1, and the connection point between the PMOS transistor 41 and the NMOS transistor 43 is connected to the terminal OUT2. When the transistors of the H-bridge circuit 25 are turned on/off, the drive current Idr flowing through a motor coil L of the motor 11 flows from the terminal OUT1 to the terminal OUT2 or from the terminal OUT2 to the terminal OUT1.

Regarding Drive Signal Output Circuit 24a

First Embodiment

Figure 2:
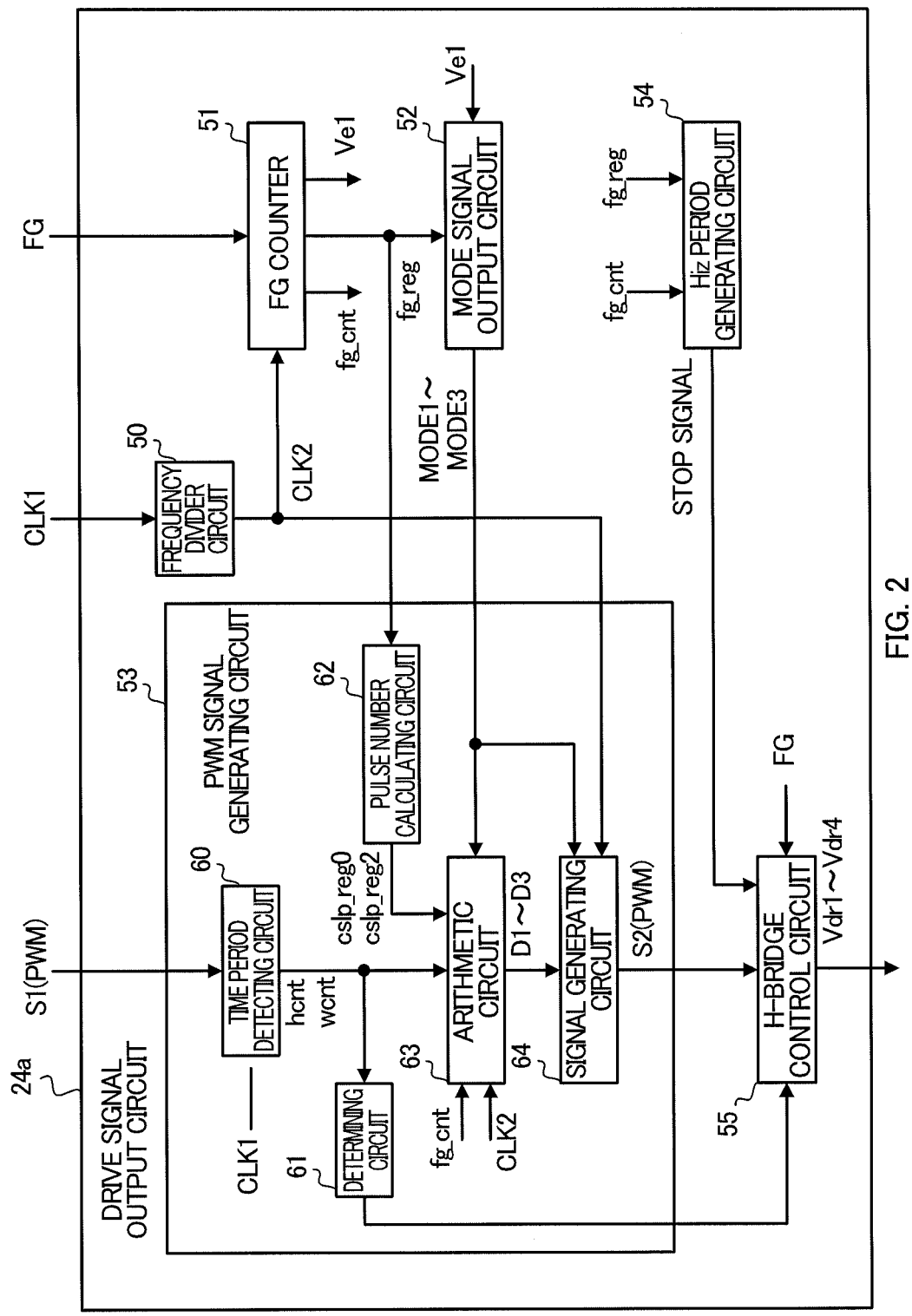

FIG. 2 depicts a configuration of a first embodiment of the drive signal output circuit 24.

A drive signal output circuit 24a (PWM signal output circuit) is a circuit configured to generate the drive signals Vdr1 to Vdr4 for changing the drive current Idr in a stepwise manner. The drive signal output circuit 24a includes a frequency dividing circuit 50, an FG counter 51, a mode signal output circuit 52, a PWM signal generating circuit 53, a Hiz period generating circuit 54, and an H-bridge control circuit 55.

The frequency dividing circuit 50 is configured to generate a clock signal CLK2 obtained by frequency-dividing the clock signal CLK1 by 128, for example.

The FG counter 51 (detecting unit) is configured to detect a time period TA during which the FG signal is high and a time period TA during which the FG signal is low, namely, a time period that is equal to half the period of the FG signal and the time period during which the direction of the drive current Idr does not change.

The mode signal output circuit 52 (dividing unit) is configured to divide the time period TA detected by the FG counter 51 into three time periods T1 to T3, and output mode signals MODE1 to MODE3 indicative of the respective time periods. The time period T1 (first time period) is a time period during which the drive current Idr is increased in a stepwise manner, the time period T2 (second time period) is a time period during which the drive current Idr is maintained constant, and the time period T3 (third time period) is a time period during which the drive current Idr is decreased in a stepwise manner.

The PWM signal generating circuit 53 (first to third output units) is configured to generate a PWM signal S2 with the predetermined period whose duty cycle is in accordance with that of the PWM signal S1 (input signal) inputted thereto. Specifically, the PWM signal generating circuit 53 generates the PWM, signal S2 whose duty cycle increases in a stepwise manner in the time period T1, is equal to the duty cycle of the PWM signal S1 in the time period T2, and decreases in a stepwise manner in the time period T3.

The Hiz period generating circuit 54 (stopping unit) is configured to calculate a time period during which all the transistors included in the H-bridge circuit 25 are off, namely, the time period during which the impedances of the terminals OUT1 and OUT2 are set at a high impedance, and to output a stop signal for stopping a switching operation of the H-bridge circuit 25 during the calculated time period.

The H-bridge control circuit 55 (control unit) is configured to generate the drive signals Vdr1 to Vdr4 based on the PWM signal S2, the FG signal, the stop signal, etc., and control the H-bridge circuit 25.

<<Details of FG Counter 51>>

Figure 3:
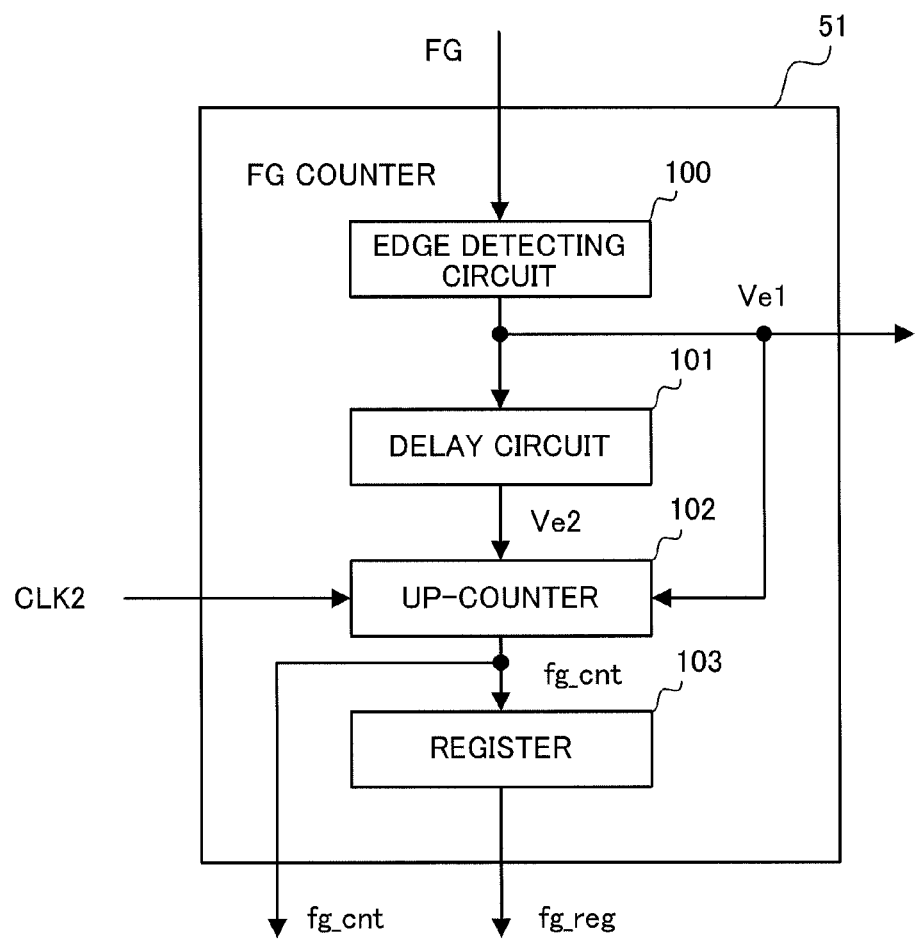
FIG. 3 is a diagram illustrating one example of an FG counter 51.

The FG counter 51 includes an edge detecting circuit 100, a delay circuit 101, an up-counter 102, and a register 103, as depicted in FIG. 3, for example.

The edge detecting circuit 100 is configured to detect the rising edge and the falling edge of the FG signal, and output an edge pulse Ve1.

The delay circuit 101 is configured to delay the edge pulse Ve1 by a predetermined time, and output a result as an edge pulse Ve2. A design is made such that the delay time in the delay circuit 101 is sufficiently shorter than the period of the clock signal CLK2.

The up-counter 102 is configured to count up based on the clock signal CLK2, and store a count value in the register 103 when the edge pulse Ve1 is inputted thereto. Further, the count value of the up-counter 102 is reset when the edge pulse Ve2 is inputted thereto.

Figure 4:
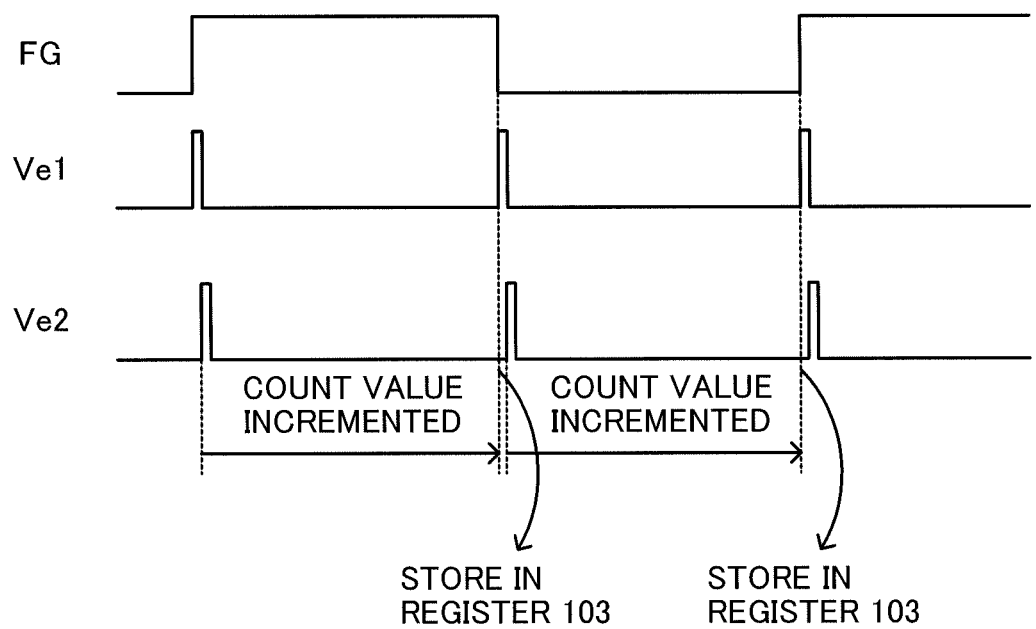
FIG. 4 is a diagram for describing an operation of an FG counter 51.

Thus, for example, as depicted in FIG. 4, every time the edge pulse Ve1 is outputted, the count value indicative of the time period during which the FG signal is high or the count value indicative of the time period during which the FG signal is low is stored in the register 103. Here, the count value of the up-counter 102 is given as count value fg_cnt, and the count value to be stored in the register 103 is given as count value fg_reg. The count value fg_reg is updated every time the up-counter 102 stores the count value.

<<Details of Mode Signal Output Circuit 52>>

Figure 5:
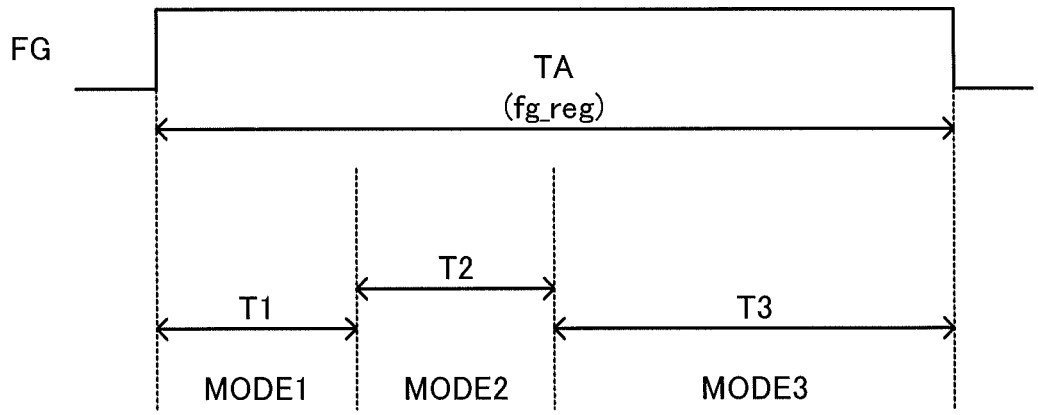
FIG. 5 is a diagram illustrating a relationship of a time period TA and time periods T1 to T3.

The mode signal output circuit 52 is configured to divide the time period TA into three time periods T1 to T3 and output the mode signals MODE1 to MODE3 indicative of the respective time periods T1 to T3, as depicted in FIG. 5, for example.

Figure 6:
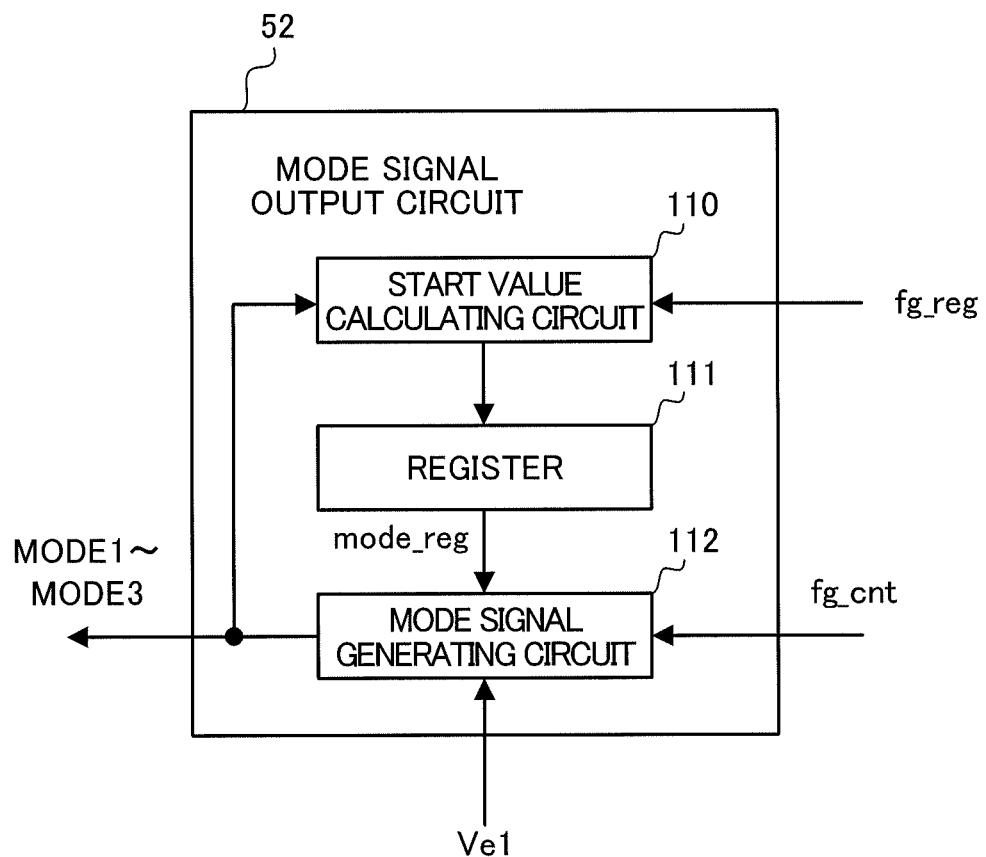
FIG. 6 is a diagram illustrating one example of a mode signal output circuit 52.

The mode signal output circuit 52 includes a start value calculating circuit 110, a register 111, and a mode signal generating circuit 112, as depicted in FIG. 6.

The start value calculating circuit 110 is configured to calculate a count value at which each of the time period T2 and the time period T3 is started, from the count value fg_reg indicative of the time period TA. Specifically, when the time period TA is divided such that the ratio of the time period T1, the time period T2, and the time period T3 becomes 1:1:2, for example, a count value CNT1 indicative of the start of the time period T2 results in (¼)×fg_reg, and a count value CNT2 indicative of the start of the time period T3 results in (½)×fg_reg. Therefore, the start value calculating circuit 110 calculates the count value CNT2 by shifting the count value fg_reg to the right by one bit, and calculates the count value CNT1 by shifting the count value fg_reg to the right by two bits, for example.

Further, the start value calculating circuit 110 stores the count value CNT1 indicative of the start of the time period T2 in the register 111 when the mode signal MODE1 is outputted, that is, during the time period T1. Furthermore, the start value calculating circuit 110 stores the count value CNT2 in the register 111 when the mode signal MODE2 is outputted, and stores the count value fg_reg in the register 111 when the mode signal MODE3 is outputted. A count value mode_reg of the register 111 is updated every time the count value is stored.

The mode signal generating circuit 112 is configured to compare the count value fg_cnt of the FG signal and the count value mode_reg, and output the mode signal in accordance with a result of such comparison. Further, the mode signal generating circuit 112 is configured to generate the mode signal MODE1 when the edge signal Ve1 is inputted thereto, namely, when the count value fg_cnt reaches zero. Then, when the count value fg_cnt is incremented to reach the count value CNT1, the mode signal generating circuit 112 generates the mode signal MODE2. Furthermore, when the count value fg_cnt is incremented to reach the count value CNT2, the mode signal generating circuit 112 generates the mode signal MODE3.

Figure 7:
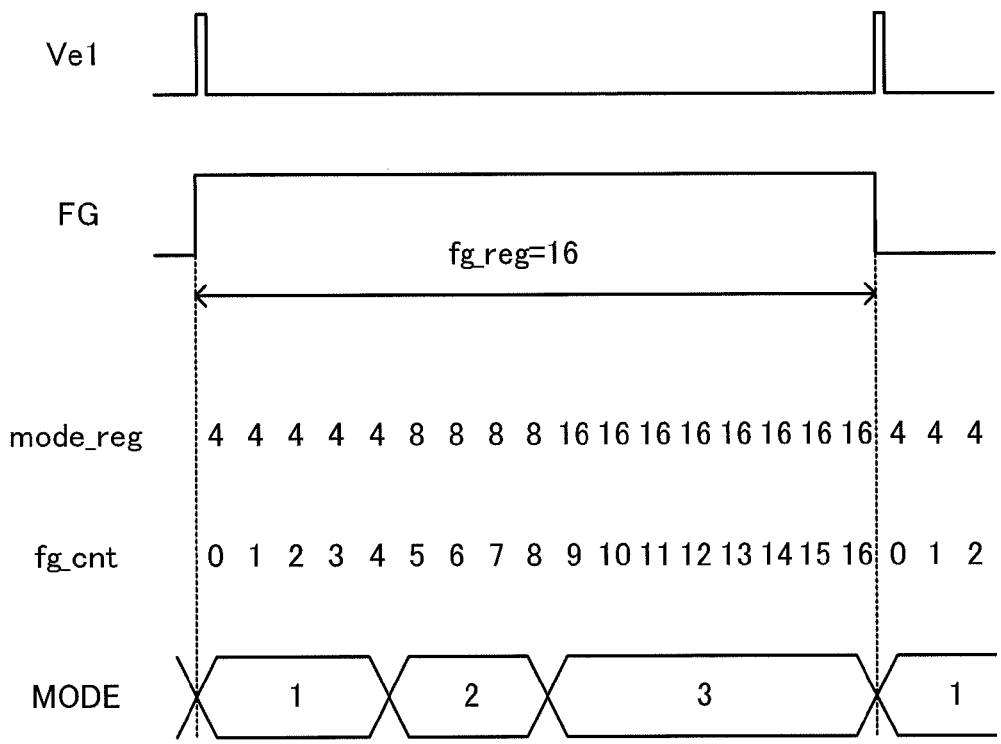
FIG. 7 is a diagram for describing an operation of a mode signal output circuit 52.

FIG. 7 is a diagram for describing an operation of the mode signal output circuit 52. A description will be given assuming that the count value fg_reg is "16", for example. Thus, the count value CNT1 at which the time period T2 starts results in "4" ((¼)×fg_reg), and the count value CNT2 at which the time period T3 starts results in "8" ((½)×fg_reg).

Firstly, when the edge pulse Ve1 is outputted, the mode signal MODE1 is generated and the count value mode_reg is set at "4". Therefore, the mode signal MODE1 indicative of the time period T1 is outputted until the count value fg_cnt reaches "4".

Next, when the count value fg_cnt reaches "4, the mode signal changes to MODE2" as well as the count value mode_reg is changed to "8". Therefore, the mode signal MODE2 indicative of the time period T2 is generated until the count value fg_cnt reaches "8".

Then, when the count value fg_cnt reaches "8", the mode signal MODE3 indicative of the time period T3 is generated. As such, the mode signal output circuit 52 is configured to divide the time period TA into the three time periods T1 to T3, and output the mode signals MODE1 to MODE3 corresponding to the respective periods T1 to T3.

<<Details of PWM Signal Generating Circuit 53>>

The PWM signal generating circuit 53 includes a time period detecting circuit 60, a determining circuit 61, a pulse number calculating circuit 62, an arithmetic circuit 63, and a signal generating circuit 64.

The time period detecting circuit 60 (time period detecting unit) is configured to detect the period of the inputted PWM signal S1 and a time period of high-level in one period of the PWM signal S1. The time period detecting circuit 60 detects the period, etc., of the PWM signal S1, using a counter (not shown) that is configured to change the count value in synchronization with the clock signal CLK1 similarly to the FG counter 51, for example. Further, the time period detecting circuit 60 is configured to output the detected period of the PWM signal S1 as a count value wcnt, and output the detected high-level period in the one period of the PWM signal S1 as a count value hcnt.

The determining circuit 61 (determining unit) is configured to calculate the duty cycle of the PWM signal S1 from the count values hcnt and wcnt, and determine whether the calculated duty cycle is greater than a predetermined value (e.g., 30%).

The pulse number calculating circuit 62 is configured to calculate the number of pulses of the PWM signal S2 that the PWM signal generating circuit 53 can output during each of the time periods T1 and T3. The PWM signal S2 according to an embodiment of the present invention is generated in synchronization with the clock signal CLK2 used in counting the time period TA. Thus, the pulse number calculating circuit 62 calculates the number of pulses cslp_reg0 of the PWM signal S2 that can be outputted during the time period T1, by multiplying the count value fg_reg indicative of the number of pulses in the time period TA as a whole by the ratio of the time period T1. Further, the pulse number calculating circuit 62 calculates the number of pulses cslp_reg2 of the PWM signal S2 that can be outputted in the time period T3, by multiplying the count value fg_reg by the ratio of the time period T3. This number of pulses cslp_reg0 is equal to the amount of change (first amount of change) in the count value fg_cnt in the time period T1 in the FG counter 51, and the number of pulses cslp_reg3 is equal to the amount of change (second amount of change) in the count value fg_cnt during the time period T3.

The arithmetic circuit 63 (first and second arithmetic units and duty calculating unit) is configured to calculate, in synchronization with the clock signal CLK2, the duty cycles D1 to D3 of the PWM signal S2 in the respective time periods T1 to T3.

Specifically, the arithmetic circuit 63 is configured to calculate the duty cycle D1 in the time period T1, based on the following equation (1), every time the count value fg_cnt changes.

$$D1 = (\text{duty}/cslp\_reg0) \times fg\_cont \tag{1}$$

where duty=hcnt/wcnt. As is apparent from the equation (1), as the time period T1 starts and the count value fg_cnt is incremented, the duty cycle D1 increases. In the equation (1), "cslp_reg0" is the amount of change in the count value fg_cnt until the time period T1 ends. Therefore, when the time period T1 ends, the duty cycle D1 results in D1=duty.

The arithmetic circuit 63 calculates the duty cycle D2 in the time period T2, based on an equation (2).

$$D2 = \text{duty} \tag{2}$$

Further, the arithmetic circuit 63 calculates the duty cycle D3 in the time period T3, based on an equation (3), every time the count value fg_cnt changes.

$$D3 = \text{duty} - (\text{duty}/\text{cslp\_reg2}) \times (fg\_cnt - CNT2) \quad (3)$$

where the count value CNT2 is the count value fg_cnt at which the time period T3 starts, and is (½)×fg_reg, for example. Thus, as the count value fg_cnt is incremented, the duty cycle D3 decreases. Further, in the equation (3), "cslp_reg2" is the amount of change in the count value fg_cnt until the end of the time period T3. Therefore, when the time period T3 ends, the duty cycle D3 results in D3=0.

When executing the calculations of the equations (1) and (3), the arithmetic circuit 63 calculates the product of a value indicative of the duty cycle (hcnt/wcnt) and the count value fg_cnt before division processing, in order to improve calculation accuracy.

The signal generating circuit 64 (first and second generating units) is configured to generate, in synchronization with the clock signal CLK2, the PWM signal S2 with the duty cycles D1 to D3 calculated in the time periods T1 to T3, respectively.

Here, a description will be given of one example of the waveform of the PWM signal S2 generated in the signal generating circuit 64 with reference to FIG. 8. Similarly to the case of FIG. 7, the count value fg_reg is given as "16", for example, the count value CNT1 at which the time period T2 starts is given as "4" ((¼)×fg_reg), and the count value CNT2 at which the time period T3 starts is given as "8" ((½)×fg_reg). Thus, "cslp_reg0" results in "4" and "cslp_reg2" results in "8". Further, it is assumed that the duty is duty=hcnt/wcnt=40%.

Firstly, by assigning values to variables in the equation (1), the duty cycle D1 in the time period T1 is expressed by an equation (4).

$$D1 = (40/4) \times fg\_cont \quad (4)$$

Thus, until the count value fg_cnt changes from "0" to "4", the duty cycle D1 increases in a stepwise manner. When the count value fg_cnt is incremented to reach "4", the time period T2 is started. The duty cycle D2 in the time period T2 is maintained constant (40%) as is apparent from the equation (2).

When the count value fg_cnt is incremented to reach "8", the time period T3 is started. By assigning values to variables in the equation (3), the duty cycle D3 in the time period T3 is expressed by an equation (5).

$$D3 = 40 - (40/8) \times (fg\_cnt - 8) \quad (5)$$

Thus, until the count value fg_cnt changes from "9" to "16", the duty cycle D3 decreases in a stepwise manner. Thus, the duty cycle of the PWM signal S2 increases in a gradual manner, is maintained constant, and thereafter decreases in a gradual manner.

<<Details of Hiz Period Generating Circuit 54>>

Figure 9:
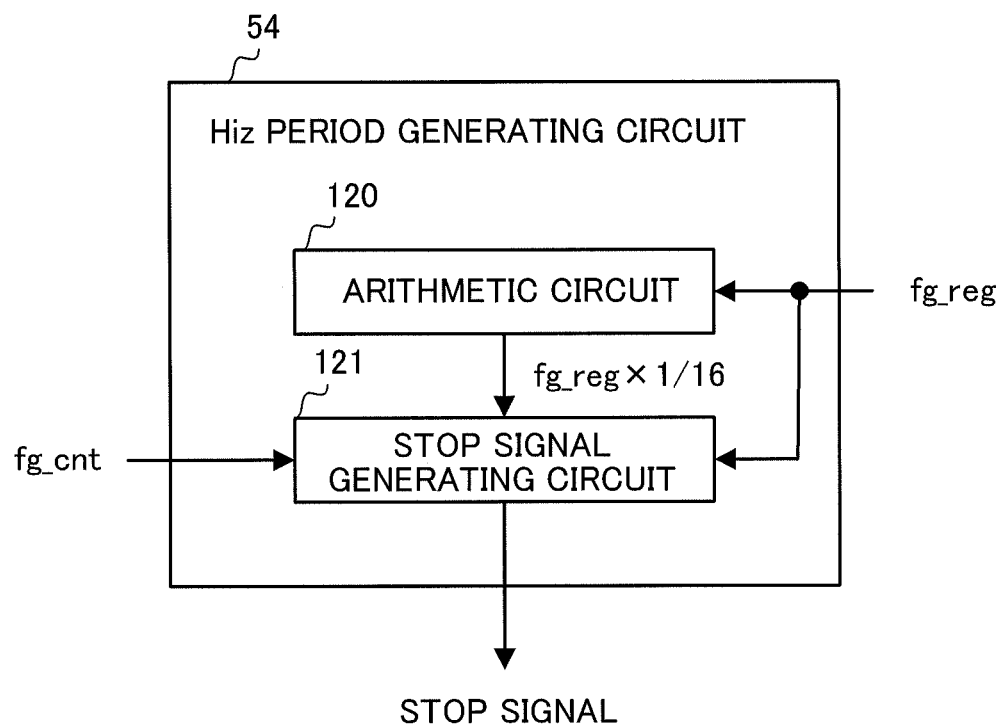
FIG. 9 is a diagram illustrating a configuration of a Hiz period generating circuit 54.

The Hiz period generating circuit 54 includes an arithmetic circuit 120 and a stop signal generating circuit 121 as shown in FIG. 9.

The arithmetic circuit 120 is configured to calculate a period equal to 1/16 of the time period TA, for example, as a time period Tz during which all the transistors included in the H-bridge circuit 25 are off. Specifically, the arithmetic circuit 120 acquires the count value fg_reg and calculates the time period Tz by shifting the count value fg_reg to the right by four bits.

The stop signal generating circuit 121 is configured to generate the stop signal during the time periods Tz before and after a time when the logic level of the FG signal changes, for example. Specifically, the stop signal generating circuit 121 outputs the stop signal during a time period during which the count value fg_cnt of the up-counter 102 changes from "0" to "fg_reg×(1/16)" and during a time period during which the count value fg_cnt changes from "fg_reg-(fg_reg×(1/16))" to "fg_reg". Thus, the stop signal is outputted during the time period Tz after a time when the time period T1 starts and during the time period Tz before a time when the time period T3 ends.

<<Details of H-Bridge Control Circuit 55>>

The H-bridge control circuit 55 is configured to generate the drive signals Vdr1 to Vdr4 based on the PWM signal S2, the FG signal, the determination result of the determining circuit 61, and the stop signal, and control the H-bridge circuit 25.

Specifically, when the stop signal is inputted, the H-bridge control circuit 55 outputs such drive signals Vdr1 to Vdr4 as to cause all the transistors included in the H-bridge circuit 25 to be turned off. When it is determined that the duty cycle of the PWM signal S1 is smaller than the predetermined value (e.g., 30%), the H-bridge control circuit 55 causes the H-bridge circuit 25 to operate in a diode rectification system. On the other than, when it is determined that the duty cycle of the PWM signal S1 is greater than the predetermined value, the H-bridge control circuit 55 causes the H-bridge circuit 25 to operate in a synchronous rectification system.

Firstly, details will be described of a case where the H-bridge control circuit 55 causes the H-bridge circuit 25 to operate in the diode rectification system.

Figure 10:
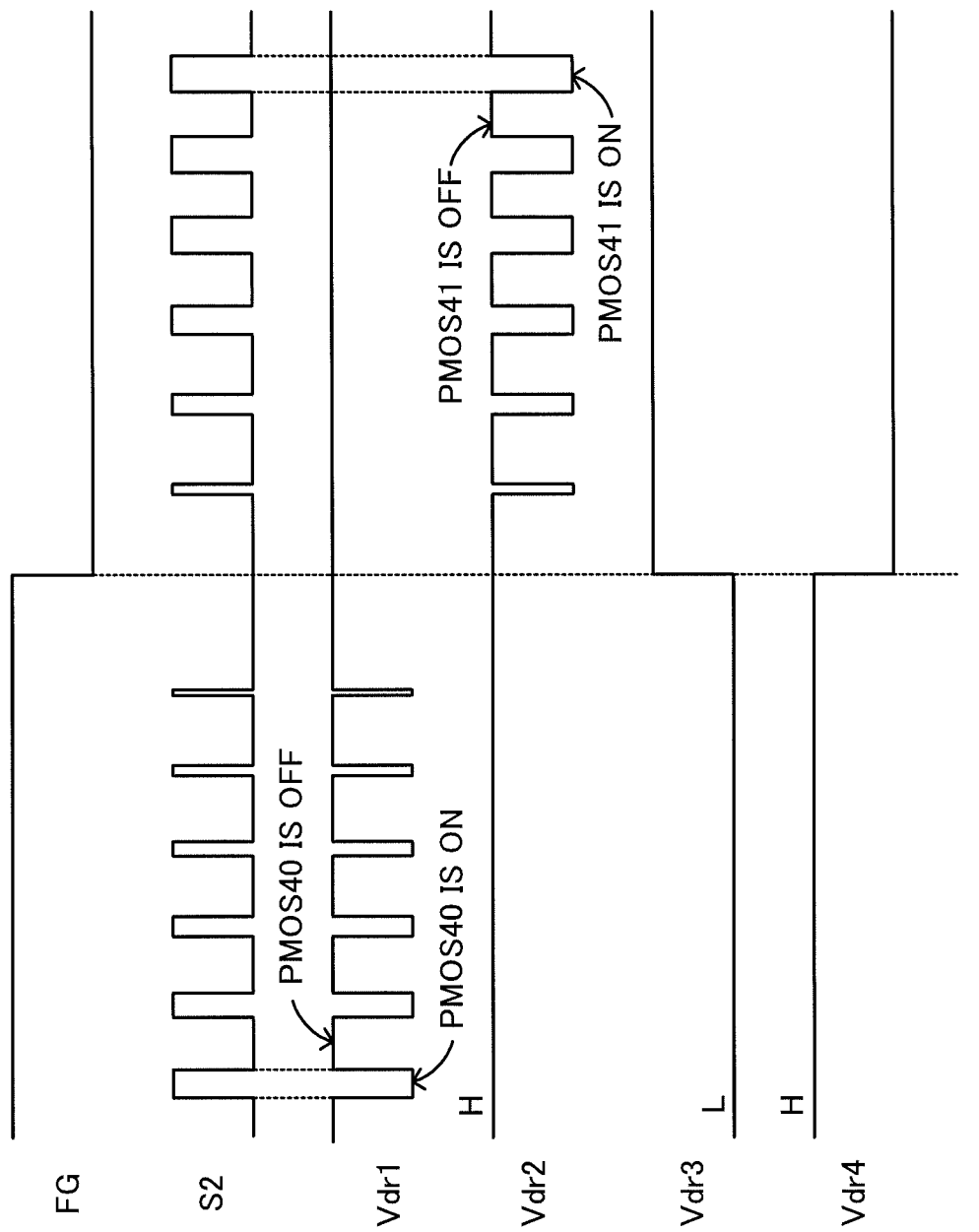
FIG. 10 is a diagram illustrating waveforms of drive signals Vdr1 to Vdr4 when operating an H-bridge circuit 25 in a diode rectification system.
Figure 11:
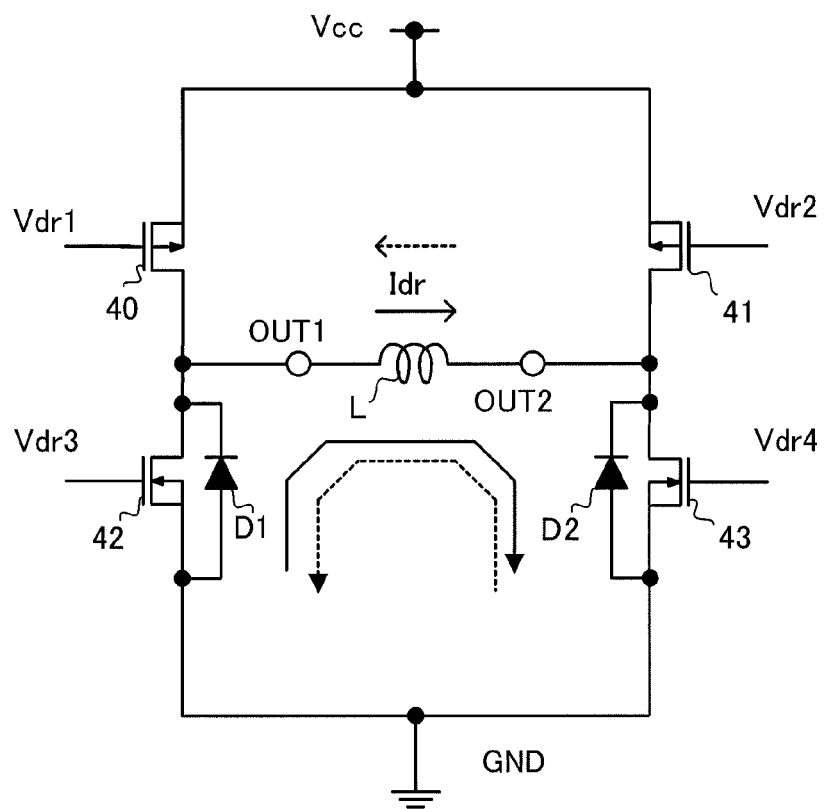
FIG. 11 is a diagram for description of an operation of a H-bridge circuit 25.

When the FG signal is high, the H-bridge control circuit 55 outputs such drive signals Vdr1 to Vdr4 as depicted in FIG. 10, to cause the drive current Idr to flow from the terminal OUT1 to the terminal OUT2. Specifically, the H-bridge control circuit 55 causes the NMOS transistor 43 to be on, and causes the PMOS transistor 41 and NMOS transistor 42 to be off, as well as performs switching of the PMOS transistor 40 based on the PWM signal S2. In such a case, during a time period during which the PMOS transistor 40 is off, the drive current Idr flows via a body diode D1 of the NMOS transistor 42 as depicted by a solid line in FIG. 11.

On the other hand, when the FG signal is low, the H-bridge control circuit 55 outputs the drive signals Vdr1 to Vdr4 to cause the drive current Idr to flow from the terminal OUT2 to the terminal OUT1.

Specifically, the H-bridge control circuit 55 causes the NMOS transistor 42 to be on, and causes the PMOS transistor 40 and NMOS transistor 43 to be off, as well as performs switching of the PMOS transistor 41 based on the PWM signal S2. As a result, when the PMOS transistor 41 is off, the drive current Idr flows via a body diode D2 of the NMOS transistor 43 as depicted by a dotted line of FIG. 11.

Next, details will be described of the case where the H-bridge control circuit 55 causes the H-bridge circuit 25 to operate in the synchronous rectification system.

Figure 12:
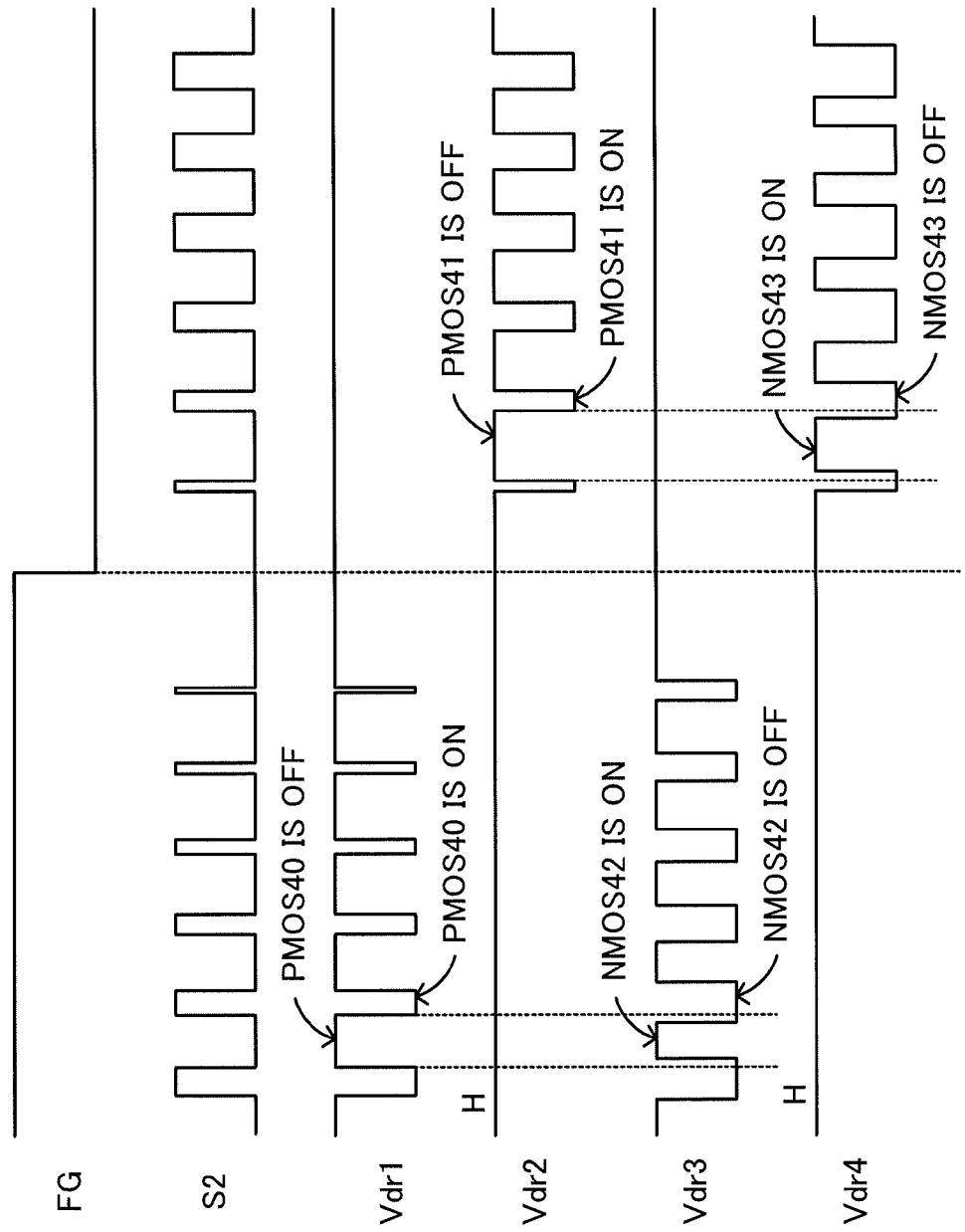
FIG. 12 is a diagram illustrating waveforms of drive signals Vdr1 to Vdr4 when operating an H-bridge circuit 25 in a synchronous rectification system.

When the FG signal is high, the H-bridge control circuit 55 turns on the NMOS transistor 43, and turns off the PMOS transistor 41, as well as performs switching of the PMOS transistor 40 and the NMOS transistor 42 in a complementary manner based on the PWM signal S2, as depicted in FIG. 12.

When the FG signal is low, the H-bridge control circuit 55 turns on the NMOS transistor 42, and turns off the PMOS transistor 40, as well as performs switching of the PMOS transistor 41 and the NMOS transistor 43 in a complementary manner based on the PWM signal S2. Thus, in this case, when the H-bridge circuit 25 is operated in the synchronous rectification system, the drive current Idr that flows via the body diodes D1 and D2 can be reduced. Although this is not specifically illustrated in FIG. 11, the PMOS transistors 40 and 41 also have body diodes similar to those of the NMOS transistors 42 and 43.

Figure 8:
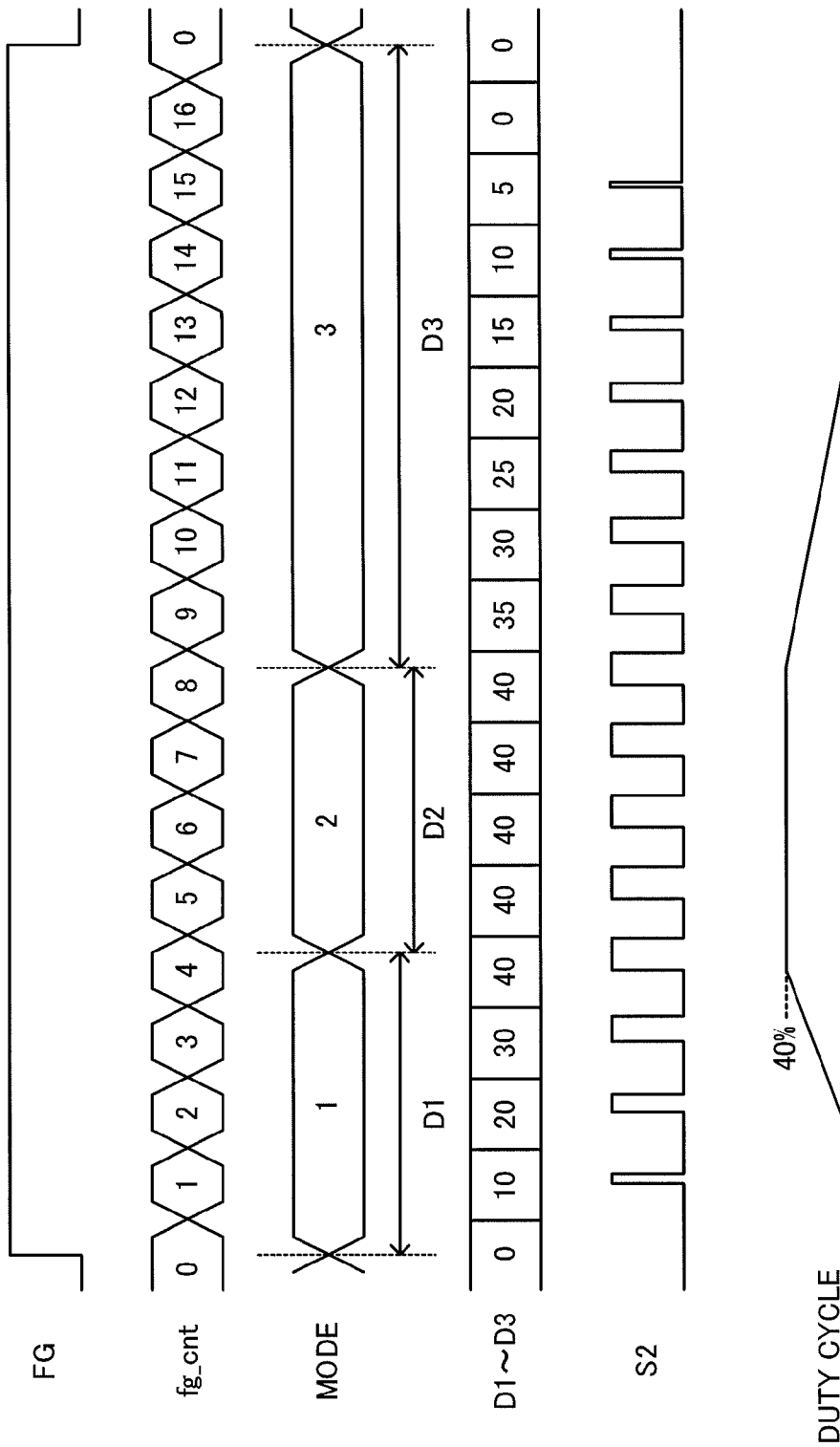
FIG. 8 is a diagram for describing an operation of a PWM signal generating circuit 53.
Figure 13:
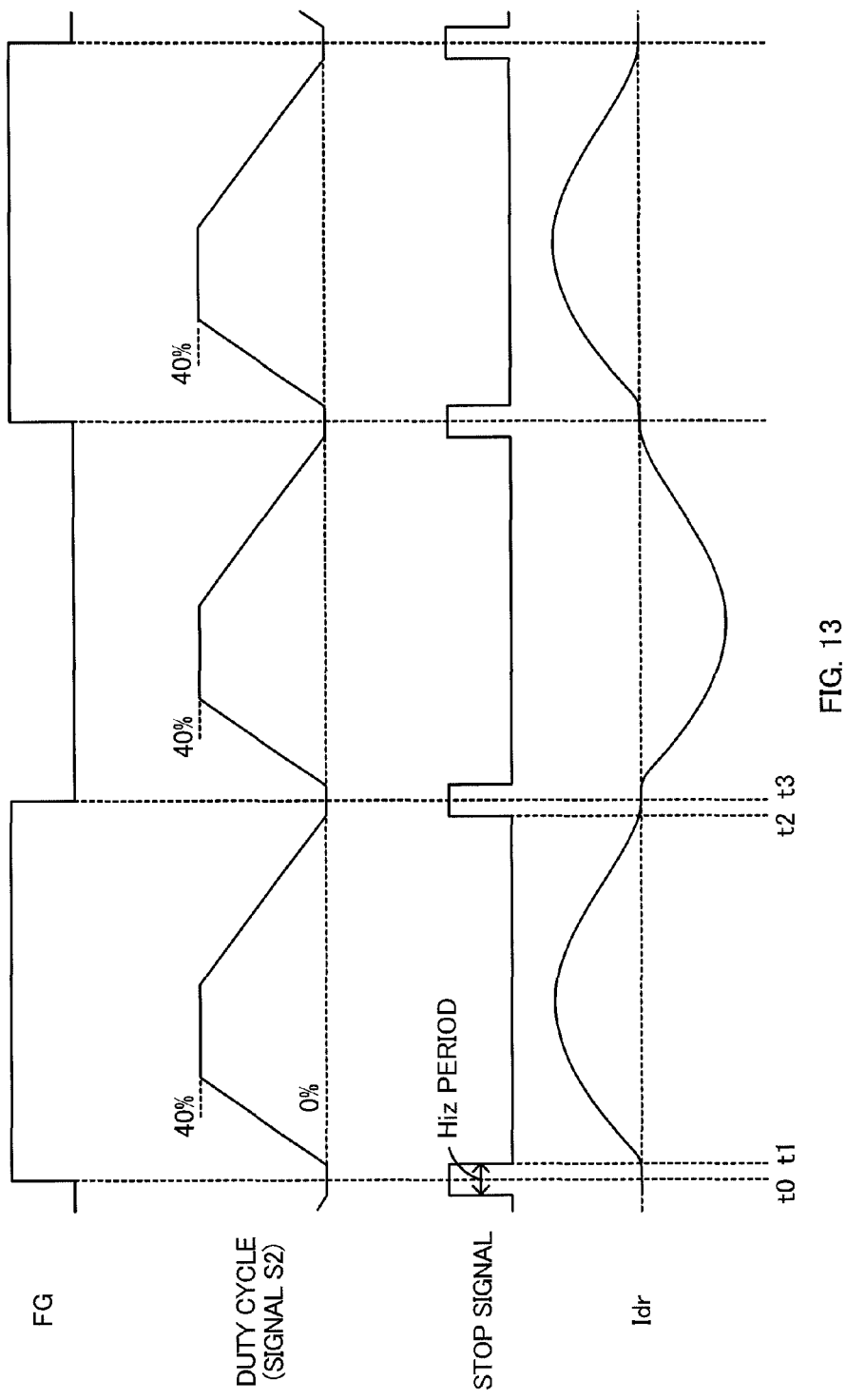
FIG. 13 is a diagram of one example of a drive current Idr.

FIG. 13 is a diagram illustrating change in the drive current Idr when the PWM signal S2 with the duty cycle that changes from 0% to 40% depicted in FIG. 8 is inputted to the H-bride control circuit 55.

For example, during a time period from time t0 to time t1, since the stop signal is outputted, the drive current Idr is zero irrespectively of the duty cycle of the PWM signal S2. At time T1, when a time period, during which the output of the H-bridge circuit 25 is in a high-impedance state, ends, the drive current Idr changes according to the duty cycle of the PWM signal S2. Specifically, as the duty cycle of the PWM signal S2 increases in a stepwise manner, the drive current Idr increases in a gradual manner; and when the duty cycle of the PWM signal S2 is maintained constant, the change in the drive current Idr is suppressed. Then, as the duty cycle of the PWM signal S2 decreases in a stepwise manner, the drive current Idr decreases in a gradual manner. It is assumed here that the current flowing from the terminal OUT1 to the terminal OUT2 is a positive current. Then, at time t2 when the stop signal is outputted again, the drive current Idr reaches zero.

In a time period from time t3 to time t4, since the FG signal is low, the drive current Idr similar to the current flowing in the time period from time t1 to time t2 flows in a negative direction.

As such, in an embodiment of the present invention, the drive current Idr continues to flow that changes in a gradual manner according to the duty cycle of the PWM signal S2.

Regarding Drive Signal Output Circuit 24b

Second Embodiment

Figure 14:
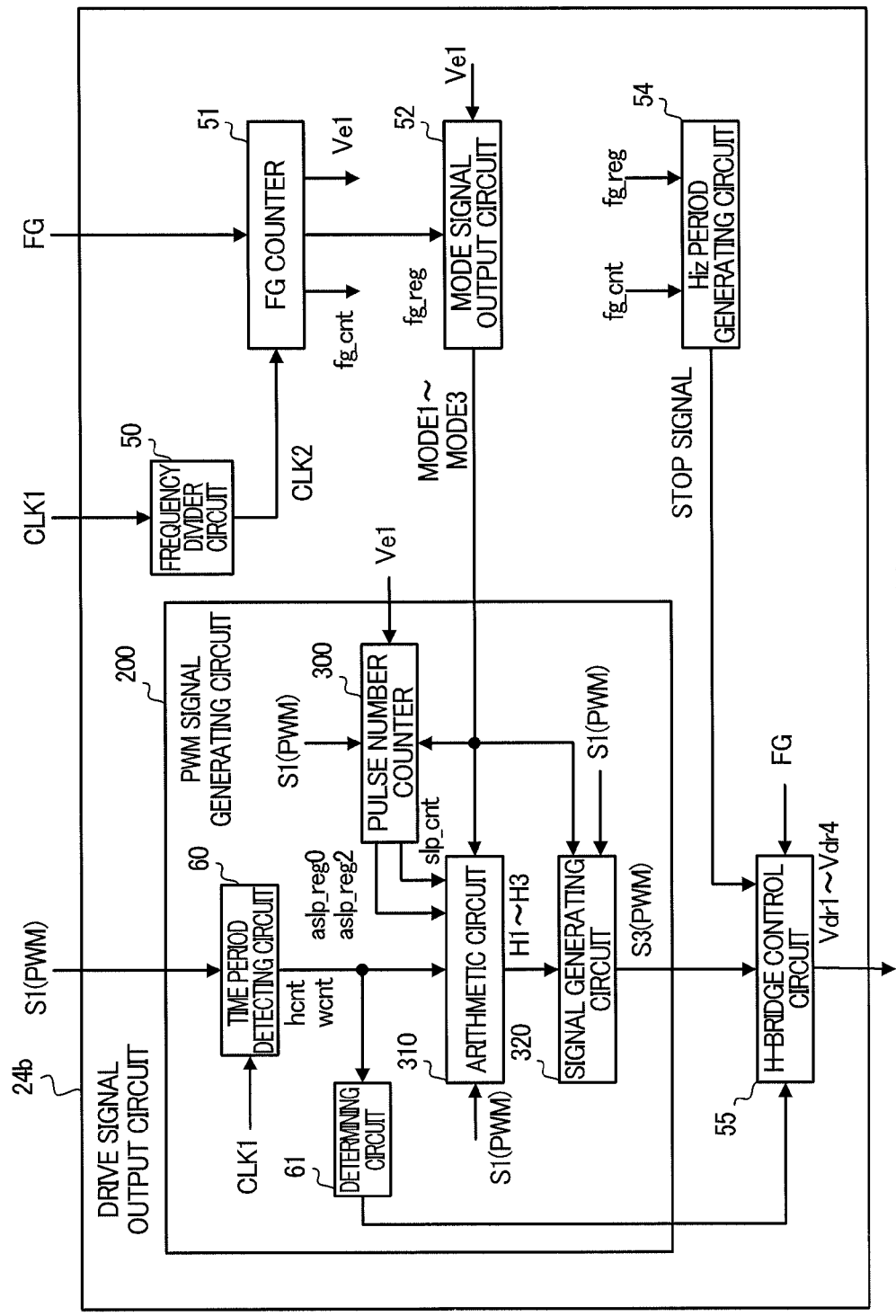
FIG. 14 is a diagram illustrating a configuration of a drive signal output circuit 24b.

FIG. 14 is a diagram illustrating a configuration of the drive signal output circuit 24 according to a second embodiment of the present invention. In FIG. 2 and FIG. 14, the blocks designated by the same reference numerals are equivalent.

A drive signal output circuit 24b (PWM signal output circuit) of FIG. 14 uses a PWM signal generating circuit 200 in place of the PWM signal generating circuit 53.

The PWM signal generating circuit 200 is a circuit configured to generate a PWM signal S3 that is in synchronizing with the inputted PWM signal S1 (input signal), and includes the time period detecting circuit 60, the determining circuit 61, a pulse number counter 300, an arithmetic circuit 310, and a signal generating circuit 320. Since the time period detecting circuit 60 and the determining unit 61 are equivalent to the blocks illustrated in FIG. 2, a description thereof is omitted.

The pulse number counter 300 is configured to count the number of pulses of the PWM signal S1 inputted in each of the time periods T1 and T3. Then, the pulse number counter 300 outputs, to the arithmetic circuit 310, the number of pulses of the PWM signal S1 counted in the time period T1, as "aslp_reg0"; and the number of pulses of the PWM signal S1 counted in the time period T3, as "aslp_reg2". It should be noted that "aslp_reg0" is the amount of change (first amount of change) in the count value slp_cnt of the pulse number counter 300 in the time period T1, and "aslp_reg2" is the amount of change (second amount of change) in the count value slp_cnt of the pulse number counter 300 in the time period T3.

The pulse number counter 300 is reset when the edge pulse Ve1 is inputted thereto, and is set at "1" as the count value slp_cnt when the mode signal MODE3 is inputted thereto, for example.

The arithmetic circuit 310 (first and second arithmetic units) is configured to calculate, in synchronization with the PWM signal S1, high-level periods H1 to H3 in one period of the PWM signal S3 in the time periods T1 to T3, respectively.

Specifically, the arithmetic circuit 310 calculates the high-level period H1 in the time period T1, based on a following equation (6), every time the count value slp_cnt changes.

$$H1 = (hcnt/aslp\_reg0) \times slp\_cnt \quad (6)$$

As is apparent from the equation (6), as the time period T1 starts and the count value slp_cnt is incremented, the high-level period H1 increases. In the equation (6), "aslp_reg0" is the amount of change in the count value slp_cnt during a time period until when the time period T1 ends. Thus, when the time period T1 ends, the high-level period H1 results in H1=hcnt.

Further, the arithmetic circuit 310 calculates the high-level period H2 in the time period T2, based on an equation (7).

$$H2 = Hcnt \quad (7)$$

Furthermore, the arithmetic circuit 310 calculates the high-level period H3 in the time period T3, based on an equation (8), every time the count value slp_cnt changes.

$$H3 = hcnt - (hcnt/aslp\_reg2) \times (slp\_cnt) \quad (8)$$

Thus, when the count value slp_cnt is incremented, the high-level period H3 is lowered. Further, in the equation (8), "aslp_reg2" is the amount of change in the count value slp_cnt during a time period until when the time period T3 ends. Thus, when the time period T3 ends, the high-level period H3 results in H3=0.

When executing the calculations of the equations (6) and (8), the arithmetic circuit 310 calculates the product of the value hcnt indicative of the high-level period and the count value slp_cnt before division processing is performed, in order to improve calculation accuracy.

The signal generating circuit 320 (first and second generating units) is configured to generate, in synchronization with the PWM signal S1, the PWM signal S3 with the high-level periods H1 to H3 calculated in the respective time periods T1 to T3.

Figure 15:
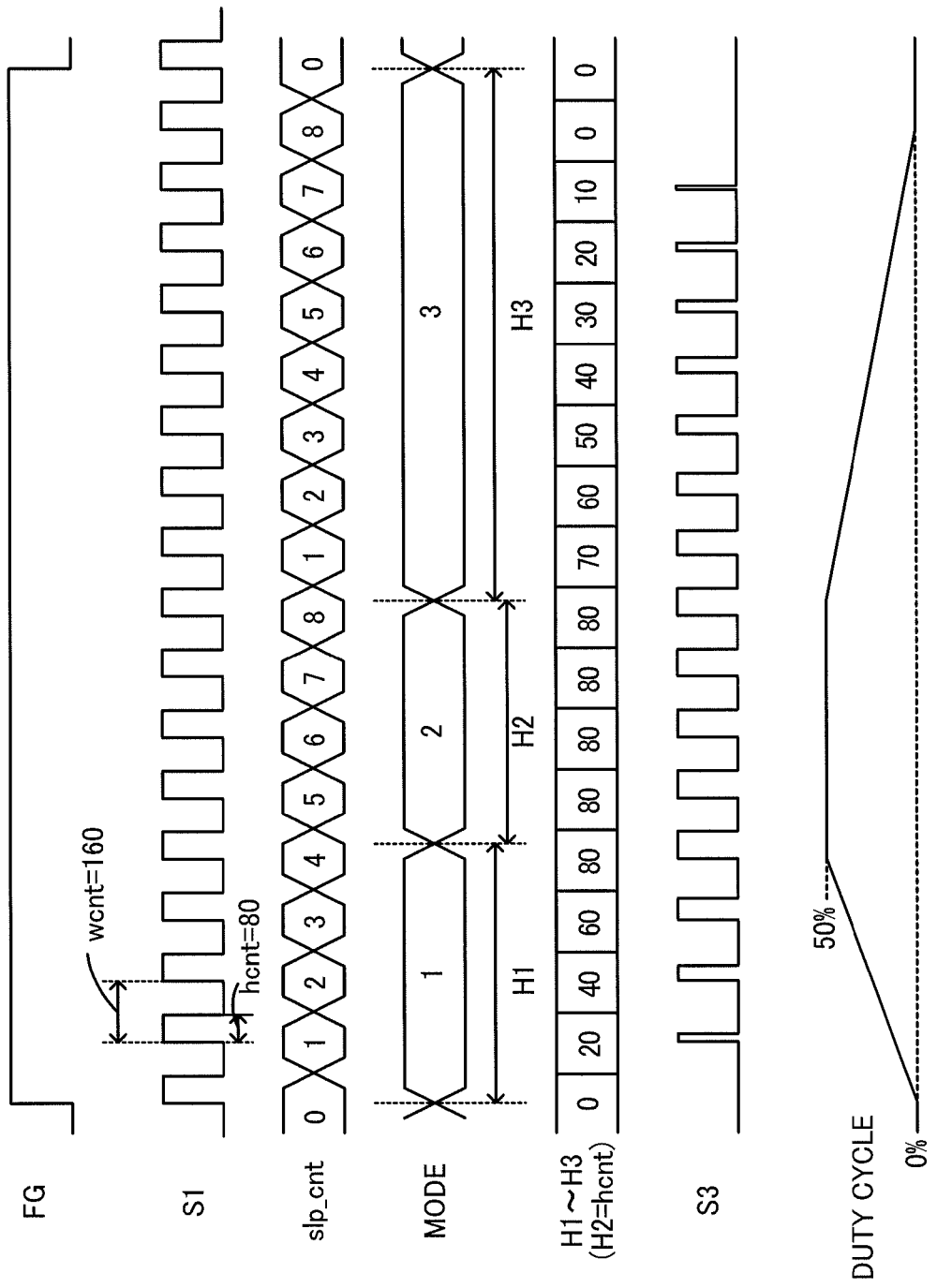
FIG. 15 is a diagram for describing an operation of a PWM signal generating circuit 200.

Here, a description will be given of one example of the waveform of the PWM signal S3 generated in the signal generating circuit 320 with reference to FIG. 15. It is assumed here that the number of pulses "aslp_reg0" of the PWM signal S1 in the time period T1 is "4", and the number of pulses "aslp_reg2" of the PWM signal S1 in the time period T3 is "8". It is also assumed that the count value "hcnt" indicative of the high-level period of the PWM signal S1 is "80" and the count value "wcnt" indicative of the time period of one period of the PWM signal S1 is "160". That is, the duty cycle of the PWM signal S1 is 50%.

Firstly, by assigning values to variables in the equation (6), the high-level period H1 in the time period T1 is expressed by an equation (9).

$$H1 = (80/4) \times slp\_cnt \quad (9)$$

Thus, until the count value slp_cnt changes from "0" to "4", the high-level period H1 increases in a stepwise manner. The high-level period H2 in the time period T2 is maintained constant at "80" as is apparent from the equation (7).

Then, when the time period T3 starts, by assigning values to variables in the equation (8), the high-level period H3 in the time period T3 is expressed by an equation (10).

$$H3 = 80 - ((80/8) \times slp\_cnt) \quad (10)$$

Thus, until the count value slp_cnt changes from "1" to "8", the high-level period H3 decreases in a stepwise manner. Since the PWM signal S3 and the PWM signal S1 are of the same period, if the high-level period of H1 to H3 changes, the duty cycle of the PWM signal S3 changes in the same manner. As a result, the duty cycle of the PWM signal S3 increases in a gradual manner, is maintained constant (50%), and thereafter decreases in a gradual manner.

Other Embodiments

<<Case of Dividing Time Period T3 into Two>>

Figure 16:
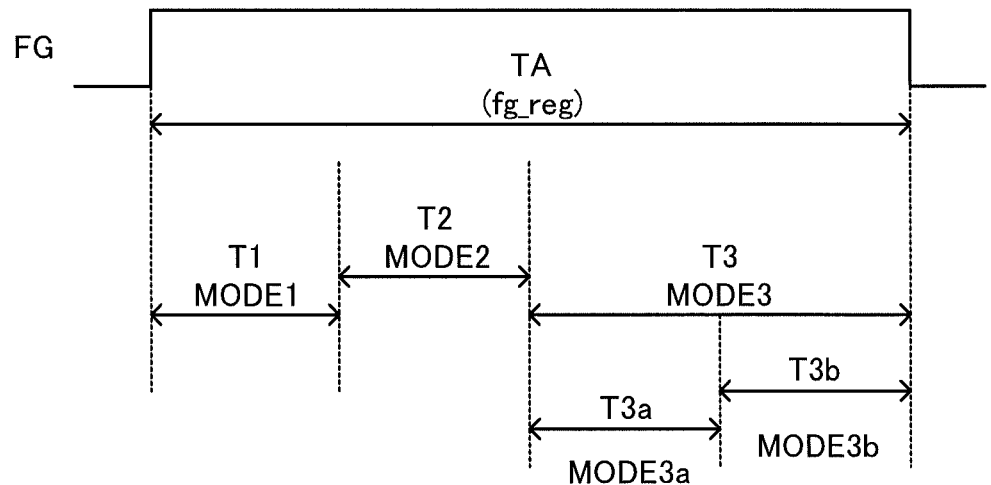
FIG. 16 is a diagram illustrating a relationship of a time period TA and time periods T1, T2, T3a, and T3b.

While, in an embodiment of the present invention, processing is performed with the time period TA divided into three, a configuration may be such that the time period T3 is further divided (e.g., divided into two equal parts) into two time periods of T3*a* (fourth time period) and T3*b* (fifth time period), as depicted in FIG. 16, for example, and that the mode signal output circuit 52 outputs mode signals MODE3*a* and MODE3*b* indicative of the respective time periods T3*a* and T3*b*. Similarly to the case of the count values CNT1 and CNT2, the count value indicative of the start of the time period T3*b* is acquired and appropriately stored in the register 111, thereby being able to cause the mode signal output circuit 52 to output the mode signals MODE3*a* and MODE3*b*, for example.

While the arithmetic circuit 63 executes the equation (3) in the time period T3, an operation different therefrom may be executed based on the mode signals MODE3*a* and MODE3*b*.

$$D3=\text{duty}-(\text{duty}/cslp\_reg2)\times(fg\_cnt-CNT2) \quad (3)$$

Specifically, when the mode signal MODE3*a* is outputted, the arithmetic circuit 63 (third arithmetic unit) may execute the operation based on an equation (11), and when the mode signal MODE3*b* is outputted, the arithmetic circuit 63 may execute the operation based on an equation (12).

$$D3a=\text{duty}-sldt\times 0.5 \quad (11)$$

$$D3b=\text{duty}-sldt\times 1.5 \quad (12)$$

where sldt is (duty/cslp_reg2)×(fg_cnt-CNT2). When these operations are executed, the duty cycle of the PWM signal S2 changes as depicted by the solid line of FIG. 17. Thus, it becomes possible to smoothen the change in the duty cycle of the PWM signal S2 in the time period T3.

<<Case of Increasing Duty Cycle at Time of Phase Switching>>

While, in the drive signal output circuit 24*b* of FIG. 14, the arithmetic circuit 310 executes the equations (6) to (8) so that the duty cycle of the PWM signal S3 increases from "0" and decreases to "0", it is not limited thereto. For example, the duty cycle of the PWM signal S3 may increase from the duty cycle equal to 25% that is the duty cycle of the PWM signal S1, and decrease to the same value. In such a case, in the time period T1, the arithmetic circuit 310 executes an equation (13) in place of the equation (6).

$$H1=(hcnt/aslp\_reg0)\times slp\_cnt\times 0.75+(hcnt\times 0.25) \quad (13)$$

Figure 18:
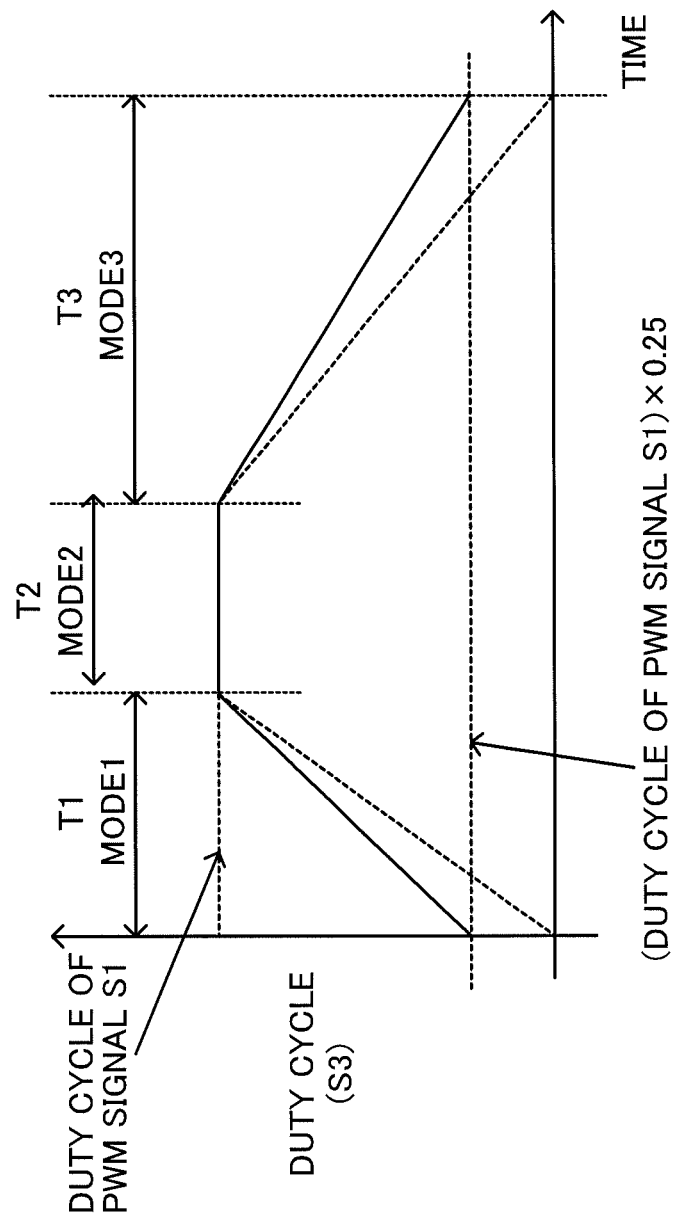
FIG. 18 is a diagram illustrating one example of a change in duty cycle of a PWM signal S3.

When such an operation is executed based on the equation (13), the high-level time period H1 at the start of the time period T1 becomes "hcnt×0.25" since the count value slp_cnt is "0", as depicted by the solid line of FIG. 18. Thus, the PWM signal S3 is outputted whose duty cycle is equal to 25% that is the duty cycle of the PWM signal S1. At the end of the time period T1, since the count value slp_cnt becomes equal to "aslp_reg0", the PWM signal S3 is outputted whose duty cycle is equal to the duty cycle of the PWM signal S1. The arithmetic circuit 310 adds the result obtained by shifting "slp_cnt" to the right by one bit and the result of shifting "slp_cnt" to the right by two bits, to calculate "slp_cnt×0.75". The arithmetic circuit 310 shifts "hcnt" to the right by two bits to acquire "hcnt×0.25".

In the time period T3, the arithmetic circuit 310 executes an equation (14) in place of the equation (8).

$$H3=hcnt-(hcnt/aslp\_reg2)\times slp\_cnt\times 0.75 \quad (14)$$

As a result, as depicted by the solid line of FIG. 18, the high-level time period H3 when the time period T3 has elapsed becomes "hcnt×0.25" since the count value slp_cnt is "aslp_reg2". Thus, when the time period T3 has elapsed, the duty cycle of the PWM signal S3 results in a value equal to 25% of the duty cycle of the PWM signal S1.

As such, the equations (13) and (14) are executed by the arithmetic circuit 310, thereby being able to increase the duty cycle of the PWM signal S3 from the duty cycle equal to 25% that is the duty cycle of the PWM signal S1, and decrease it to the same value. In such a case, the inclination of the duty cycle in the time period T1 and the time period T3 becomes gentle, thereby being able to suppress the noise of the motor 11.

Hereinabove, the motor drive IC 10 according to embodiments of the present invention has been described. In embodiments of the present invention, the ratio of the time periods T1 and T3 (soft switching period) to the time period TA during which the FG signal is high (or low) is constant. Thus, the motor drive IC 10 can change the drive current Idr of the motor coil L in a gradual manner, irrespectively of the rotation speed of the motor 11. In embodiments of the present invention, it is not required to use a high-accuracy operational amplifier, etc., thereby being able to reduce the circuit size.

The PWM signal generating circuit 53 changes the duty cycle of the PWM signal S2, based on the count value fg_cnt that changes in synchronization with the PWM signal S2 that is to be outputted therefrom. Thus, the PWM signal generating circuit 53 can reliably change the duty cycle of the PWM signal S2, every time the PWM signal S2 is outputted therefrom, in the time period during which the soft switching is performed.

Further, for example, when executing the calculation of the equations (1) and (3), the arithmetic circuit 63 performs multiplication processing and thereafter division processing, thereby being able to prevent calculation accuracy from deteriorating.

Further, the PWM signal generating circuit 53 can generate the PWM signal S2 with a period different from that of the inputted PWM signal S1.

Figure 17:
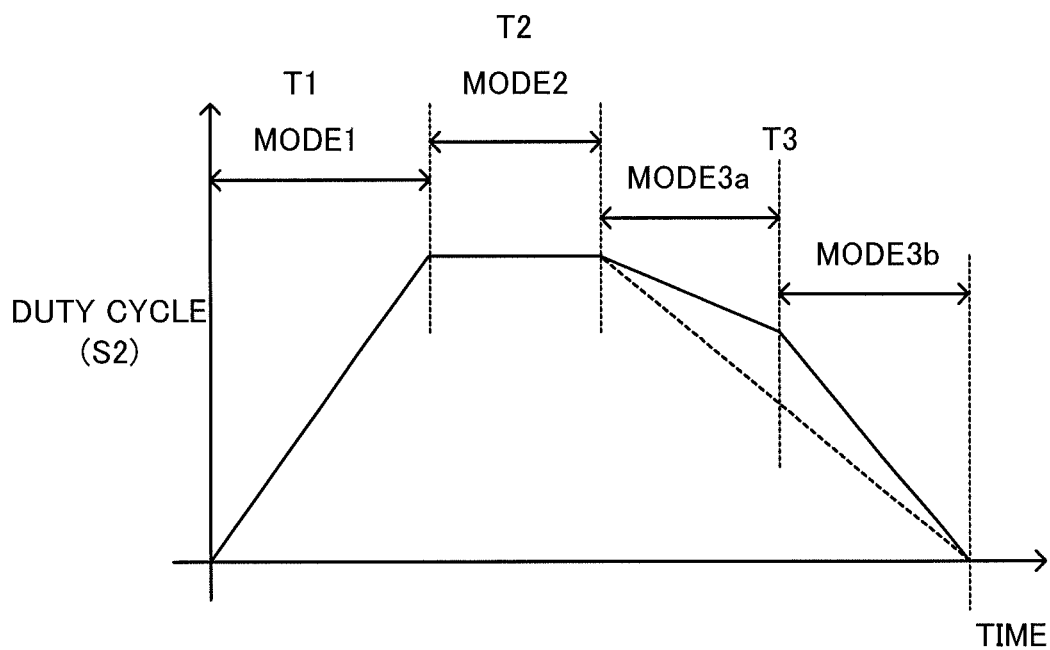
FIG. 17 is a diagram illustrating one example of a change in duty cycle of a PWM signal S2 when a time period T3 is divided.

Further, for example, as depicted in FIGS. 16 and 17, the time period T3 is further divided, thereby being able to smoothen the change in the duty cycle of the PWM signal S2. As a result, the drive current Idr becomes gentle.

Further, the drive signal output circuit 24*a* controls the duty cycle of the PWM signal S2 based on the count value fg_cnt of the FG counter 51. That is, the drive signal output circuit 24*a* is not required to be provided with a dedicated counter to control the duty cycle of the PWM signal S2.

Further, the PWM signal generating circuit 200 can generate the PWM signal S3 for soft switching to be performed, in synchronization with the inputted PWM signal S1.

In the time period Tz before and after a time when the FG signal changes in logic level, the output of the H-bridge 25 is in a high-impedance state. Thus, when the drive current Idr changes in direction, the drive current Idr can reliably be made zero.

Further, when the duty cycle of the inputted PWM signal S1 abruptly changes from a high state to a low state, an overcurrent might flow in the H-bridge circuit 25, on the power source side, that is driven in the synchronous rectification system. In embodiments of the present invention, when the duty cycle of the PWM signal S1 is lower than the predetermined value, the H-bridge circuit 25 is driven in the diode rectification system. Thus, the occurrence of the overcurrent on the power source side can be suppressed.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A PWM signal output circuit configured to output a PWM signal with a duty cycle corresponding to a duty cycle of an input signal to a drive circuit configured to drive a motor based on the PWM signal, the PWM signal output circuit comprising:
   a detecting circuit configured to detect a time period in which a speed signal is at one logic level or at an other logic level, based on the speed signal whose logic level changes in an alternate manner, the speed signal having a period corresponding to a rotation speed of the motor;
   a dividing circuit configured to divide each of the time periods detected by the detecting circuit into first to third time periods;
   a PWM generating circuit configured to control a duty cycle of the PWM signal so that the duty cycle of the PWM signal changes in a stepwise manner toward a duty cycle of the input signal, in order to increase a current flowing through a motor coil of the motor, in the first time period, and output the PWM signal with the duty cycle;
   the PWM generating circuit configured to control the duty cycle of the PWM signal so that the duty cycle of the PWM signal becomes equal to the duty cycle of the input signal, in order to maintain the current flowing through the motor coil constant, in the second time period; and
   the PWM generating circuit configured to control the duty cycle of the PWM signal so that the duty cycle of the PWM signal changes in a stepwise manner from the duty cycle of the input signal, in order to decrease the current flowing through the motor coil, in the third time period, and output the PWM signal with the duty cycle.

2. The PWM signal output circuit of claim 1, further comprising:
   a counter configured to change a count value in synchronization with the PWM signal, wherein
   the PWM generating circuit is configured to control the duty cycle of the PWM signal, based on a value corresponding to the duty cycle of the input signal, a first amount of change in the count value of the counter in the first time period, and a first count value of the counter, and output the PWM signal with the duty cycle, and wherein
   the PWM generating circuit is configured to control the duty cycle of the PWM signal, based on the value corresponding to the duty cycle of the input signal, a second amount of change in the count value of the counter in the third time period, and second count value of the counter, and output the PWM signal with the duty cycle.

3. The PWM signal output circuit of claim 2, wherein the PWM generating circuit includes:
   an arithmetic circuit configured to divide a first product of the value corresponding to the duty cycle of the input signal and the first count value of the counter, by the first amount of change;
   a generating circuit configured to generate the PWM signal with the duty cycle corresponding to a first arithmetic result of the arithmetic unit;
   the arithmetic circuit configured to divide a second product of the value corresponding to the duty cycle of the input signal and a value corresponding to a the second count value of the counter, by the second amount of change; and
   the generating circuit configured to generate the PWM signal with the duty cycle corresponding to a second arithmetic result of the arithmetic circuit.

4. The PWM signal output circuit of claim 3, further comprising:
   a duty calculating circuit configured to calculate a duty cycle of the input signal, wherein
   the arithmetic circuit is configured to divide a first product of the value indicative of the detected duty cycle and the first count value of the counter, by the first amount of change, and to divide a second product of the value indicative of the detected duty cycle and the second count value of the counter, by the second amount of change.

5. The PWM signal output circuit of claim 3, wherein
   the dividing circuit is configured to further divide the third time period into a fourth time period and a fifth time period, wherein
   the arithmetic circuit is configured to perform predetermined arithmetic processing for an arithmetic result of the arithmetic circuit and output a result obtained by performing the predetermined arithmetic processing, so that change in duty cycle of the PWM signal in the fourth time period become more gradual than change in duty cycle of the PWM signal in the fifth time period, and wherein
   the generating circuit is configured to generate the PWM signal with the duty cycle corresponding to an arithmetic result of the arithmetic circuit.

6. The PWM signal output circuit of claim 2, wherein the detecting circuit is configured to detect each of the time periods, based on the count value of the counter.

7. The PWM signal output circuit of claim 3, further including a time period detecting circuit configured to detect a first time period of a first logic level of the input signal, wherein
   the arithmetic circuit is configured to divide a product of a value indicative of the first time period and the first count value of the counter, by the first amount of change, wherein
   the generating circuit is configured to generate the PWM signal with the duty cycle corresponding to a first arithmetic result of the arithmetic circuit, in synchronization with the input signal, wherein
   the arithmetic circuit is configured to divide a product of a value indicative of the time period of the first logic level and the second count value of the counter, by the second amount of change, and wherein
   the generating circuit is configured to generate the PWM signal with the duty cycle corresponding to a second arithmetic result of the arithmetic circuit, in synchronization with the input signal.

8. The PWM signal output circuit of claim 1, further comprising:

a stopping circuit configured to stop an operation of the drive circuit during a first time interval shorter than the first time period, after a start of the first time period; and stop an operation of the drive circuit during a second time interval shorter than the third time period, before an end of the third period.

9. The PWM signal output circuit of claim 1, further comprising:

a determining circuit configured to determine whether or not a duty cycle of the input signal is greater than a predetermined value; and a control circuit configured to cause the drive circuit to operate in a synchronous rectification system when it is determined that the duty cycle of the input signal is greater than the predetermined value, and cause the drive circuit to operate in a diode rectification system when it is determined that the duty cycle of the input signal is smaller than the predetermined value.

* * * * *